US006763523B1

(12) United States Patent
Sacilotto, Jr. et al.

(10) Patent No.: US 6,763,523 B1
(45) Date of Patent: Jul. 13, 2004

(54) INTELLIGENT TRANSFER OF MULTIMEDIA DATA FILES FROM AN EDITING SYSTEM TO A PLAYBACK DEVICE

(75) Inventors: Roger P. Sacilotto, Jr., Saugus, MA (US); Martin S. Doehring, Bolton, MA (US)

(73) Assignee: Avid Technology, Inc., Tewksbury, MA (US)

( * ) Notice: Subject to any disclaimer, the term of this patent is extended or adjusted under 35 U.S.C. 154(b) by 0 days.

(21) Appl. No.: 09/054,868

(22) Filed: Apr. 3, 1998

(51) Int. Cl.[7] .......................... H04N 7/10; H04N 7/173; H04N 7/16; G09G 5/00; G06F 17/30

(52) U.S. Cl. ...................... 725/91; 725/32; 725/36; 725/134; 725/138; 345/723; 707/206

(58) Field of Search ................. 345/723; 725/32, 725/36, 91, 114, 138; 707/206

(56) References Cited

U.S. PATENT DOCUMENTS

| | | | |
|---|---|---|---|
| 5,038,211 A | * | 8/1991 | Hallenbeck ................ 358/142 |
| 5,045,940 A | | 9/1991 | Peters et al. |
| 5,117,497 A | | 5/1992 | Kanamori et al. |
| 5,197,047 A | | 3/1993 | Witheridge et al. |
| 5,499,046 A | | 3/1996 | Schiller et al. |
| 5,574,913 A | | 11/1996 | Ohtsu |
| 5,577,258 A | | 11/1996 | Cruz et al. |
| 5,581,530 A | | 12/1996 | Iizuka et al. |
| 5,649,046 A | * | 7/1997 | Stewart et al. ............... 386/52 |
| 5,652,613 A | * | 7/1997 | Lazarus et al. ............... 348/7 |
| 5,706,486 A | | 1/1998 | Cruz et al. |
| 5,715,018 A | | 2/1998 | Fasciano et al. |
| 5,719,985 A | | 2/1998 | Ito et al. |
| 5,793,971 A | | 8/1998 | Fujita et al. |
| 5,799,150 A | | 8/1998 | Hamilton et al. |
| 5,808,628 A | | 9/1998 | Hinson et al. |
| 5,819,160 A | | 10/1998 | Foladare et al. |
| 5,852,435 A | | 12/1998 | Vigneaux et al. |

(List continued on next page.)

FOREIGN PATENT DOCUMENTS

| | | |
|---|---|---|
| EP | 0 601 749 A1 | 6/1994 |
| EP | 0615 244 A2 | 9/1994 |
| EP | 0644 545 A2 | 3/1995 |
| EP | 0 715 460 A1 | 6/1996 |
| EP | 0 753 852 A1 | 1/1997 |
| EP | 0 774 756 A2 | 5/1997 |
| EP | 0801 389 A2 | 10/1997 |
| EP | 0 801 391 A2 | 10/1997 |
| EP | 0 803 873 A2 | 10/1997 |
| EP | 0847 055 A2 | 6/1998 |
| WO | WO99/05821 | 2/1999 |

OTHER PUBLICATIONS

J. Burghardt, "Das Sony–News–System," Nov. 1996, vol. 50, No. 11, pp. 641–646, Fernseh– Und Kino–Technik.

H. Gröger, "Der Digitale Newsroom," Nov. 1996, vol. 50, No. 11, pp. 654–656, Fernseh– Und Kino–Technik.

MOS Protocol, Media Object Server Protocol, Proposed 2.02 XML Evolution, Mar. 1999, pp. i–49.

*Primary Examiner*—Vivek Srivastava
*Assistant Examiner*—Son P. Huynh
(74) *Attorney, Agent, or Firm*—Peter J. Gordon (57) ABSTRACT

A method and system is provided to avoid the duplicate storage and transfer of multimedia data in a playback device, thereby increasing system bandwidth and available playback memory. A multimedia composition describes an edited piece of audio and video multimedia data. The composition is created and transferred to a playback device. The composition is examined to determine whether the multimedia data referred to in the composition is already stored in the playback device. If the data is stored in the playback device, or in transit to the playback device, it is not transferred to the playback device.

25 Claims, 5 Drawing Sheets

U.S. PATENT DOCUMENTS

| | | | |
|---|---|---|---|
| 5,892,915 A | | 4/1999 | Duso et al. |
| 5,905,842 A | * | 5/1999 | Kajimoto ..................... 386/52 |
| 5,924,071 A | | 7/1999 | Morgan et al. |
| 5,986,979 A | | 11/1999 | Bickford et al. |
| 5,991,374 A | | 11/1999 | Hazenfield |
| 5,995,091 A | | 11/1999 | Near et al. |
| 6,009,228 A | | 12/1999 | Fujita et al. |
| 6,026,368 A | | 2/2000 | Brown et al. |
| 6,049,332 A | | 4/2000 | Boetje et al. |
| 6,073,727 A | | 6/2000 | DiFranza et al. |
| 6,088,703 A | | 7/2000 | Kaneko |
| 6,091,407 A | | 7/2000 | Boetje et al. |
| 6,104,334 A | | 8/2000 | Allport |
| 6,119,144 A | | 9/2000 | Fujita et al. |
| 6,141,007 A | | 10/2000 | Lebling et al. |
| 6,211,869 B1 | * | 4/2001 | Loveman et al. ........... 345/328 |
| 6,243,725 B1 | | 6/2001 | Hempleman et al. |
| 6,351,765 B1 | * | 2/2002 | Pietropaolo et al. ........ 709/218 |
| 6,378,129 B1 | * | 4/2002 | Zetts ........................... 725/94 |
| 6,473,902 B1 | * | 10/2002 | Noritomi ..................... 725/91 |
| 6,489,969 B1 | | 12/2002 | Garmon et al. |

* cited by examiner

INTELLIGENT TRANSFER OF MULTIMEDIA DATA FILES FROM AN EDITING SYSTEM TO A PLAYBACK DEVICE

FIELD OF THE INVENTION

This invention relates to methods and apparatus for use in a multimedia system. More particularly, the invention relates to editing, transferring, storing and playing back a multimedia composition so that multiple multimedia compositions are able to share the same multimedia data.

BACKGROUND OF THE INVENTION

Efficiently editing, playing back and broadcasting multimedia data is a priority in the news industry. Multimedia data includes audio and video data collected from various sources such as video cameras, satellite, video and audio tape, compact disc, etc. An editor typically creates a news clip from multimedia data source material and the edited news clip is physically transferred to a playback device for broadcast.

Networking advances have automated the process of transferring of the edited news clip to the playback device. In such systems, a news clip is created from source material and edited at one of a plurality of editing workstations connected to a network. The edited clip is given an identifier (ID) and electronically transferred from the workstation to a playback device which can store the clip for later play to air. The playback device then plays the news story to air when the producer queues the ID of the clip.

The foregoing network, however, may waste bandwidth and memory by re-sending and restoring the same multimedia data used in different edited clips. For example, an editor sends a finished news clip to a playback device and wants to make minor changes. The editor may wish to delete five seconds of a thirty second news clip which was previously sent to the playback device. In such a case, the editor edits the clip at the workstation and resends the entire clip minus the five seconds which were deleted. Thus, the playback device stores two clips, both of which contain the same portion of multimedia data.

Another example of wasted bandwidth is the common occurrence in news journalism wherein a promotional clip is used in conjunction with a story. In such a case, a short clip of a larger news clip would be created for use as a promotional clip. The clip consisting only of the promotional clip would need to be sent, and the larger clip that contains the promotional clip that is used when the news story airs would be separately sent and stored in the playback device. Thus, in both examples cited above the identical multimedia data is transferred to, and stored within, two locations within the playback device.

SUMMARY OF THE INVENTION

A method and system is provided to avoid the duplicate storage and transfer of multimedia data in a playback device, thereby increasing system bandwidth and available playback memory. A multimedia composition which represents a compilation of edited source material is created and transferred to the playback device. The composition is examined to determine whether the multimedia data referred to in the composition is already stored in the playback device. If the data is stored in the playback device, or in transit to the playback device, it is not transferred to the playback device.

In one aspect of the invention, a method is provided for sharing data that includes the steps of creating a multimedia composition which references data, transferring the multimedia composition to a first location, determining whether the data referenced by the multimedia composition is contained in a storage area associated with the first location, and transferring the data referenced by the multimedia composition to the storage area only when the data is not already in the storage area.

In another embodiment, a multimedia system is provided that includes at least one workstation to create a multimedia composition which references data, a playback device coupled to the workstation to store and play multimedia compositions created by the workstation, and a transfer tool. The transfer tool transfers the multimedia composition and the data referenced by the multimedia composition from the workstation to the playback device. The transfer tool is adapted to only transfer data referenced by the multimedia composition that is not stored in the playback device.

In another embodiment, a method of deleting multimedia data in a device containing multimedia compositions and data referenced by the multimedia compositions is provided. The method includes determining how many compositions refer to particular portions of multimedia data, determining which portions of multimedia data no compositions refer to, and deleting the multimedia data that no multimedia compositions refer to.

BRIEF DESCRIPTION OF THE DRAWINGS

The invention will be better understood and appreciated from the following detailed description of illustrative embodiments thereof, and the accompanying drawings, in which.

DETAILED DESCRIPTION

Figure 1:
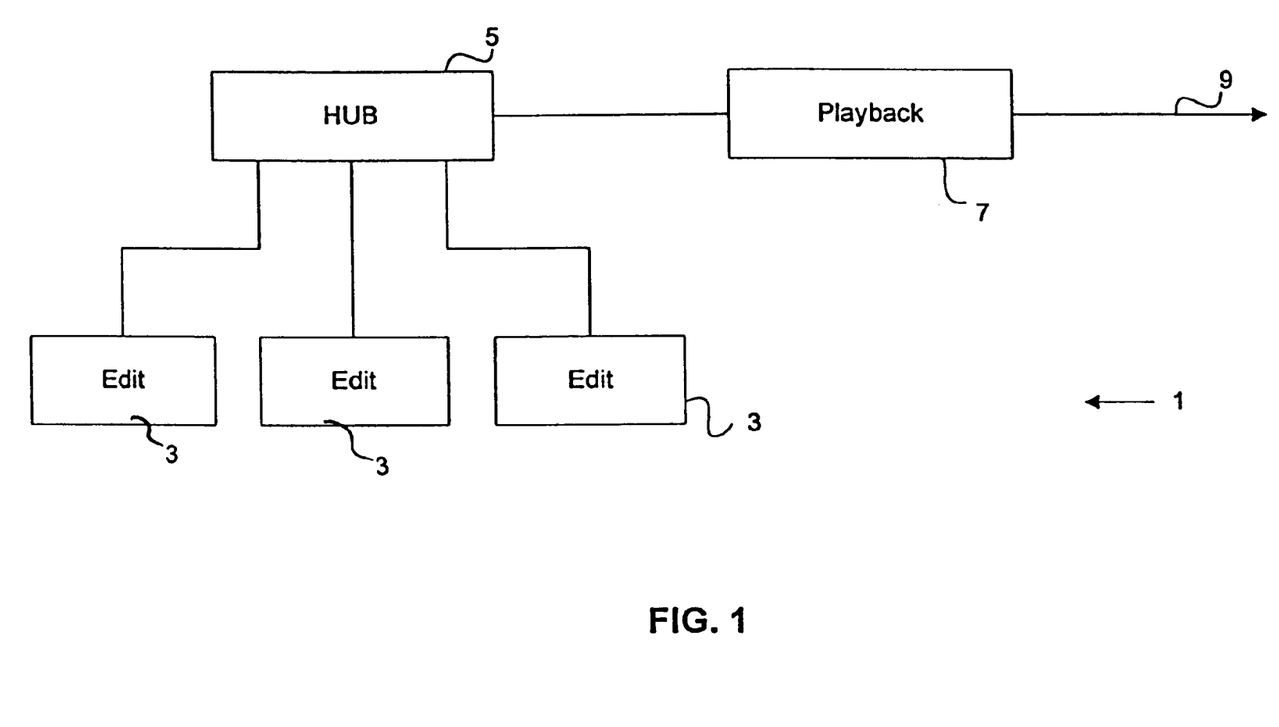
FIG. 1 shows an embodiment of a multimedia network.
Figure 2:
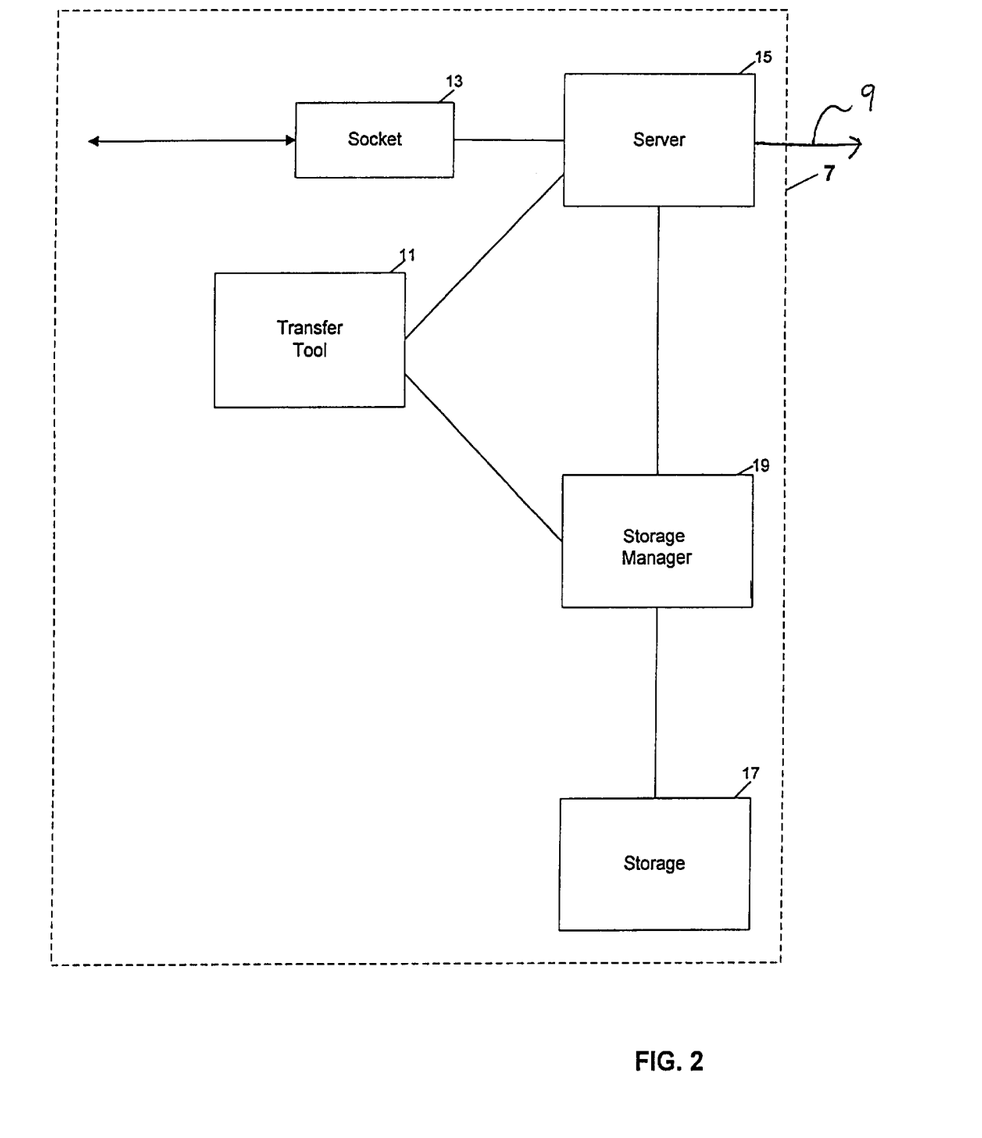
FIG. 2 shows the playback device 7 of FIG. 1.

FIGS. 1 and 2 show an embodiment of an exemplary multimedia network 1. The network 1 includes edit workstations 3 coupled to a hub 5. Multimedia compositions are formed at the edit workstations 3 and transferred via hub 5 to a playback device 7 which stores the media compositions and multimedia data associated therewith for playing to air the data from an output 9 of the playback device. Although the invention is not limited to a particular type of playback device, an example of such a playback device is sold by Pluto Technologies International, Inc. under the trademark Video Space.

The multimedia composition is a structure used to described an edited piece of audio and video multimedia data. The multimedia data is not part of the composition, that is, the composition only refers to the data to be played. The data structure used for representing a composition excludes the actual multimedia data by containing only indications of, or references to, the multimedia data. A composition is made up of source components, or clips, representing a section of concrete media such as video or audio data. The clip includes an identification of the source material from which the clip originated, as well as a range of material within the source material.

The composition data structure can be, for example, a C++ programming object. A composition can be formed in the manner described in U.S. Pat. No. 5,724,605 or as in the Open Media Framework (OMF) Interchange Specification, Version 2.1 from Avid Technology, Inc., which are herein incorporated by reference. A composition can also be formed in the manner described in the Advanced Authoring Format (AAF) specification. The invention, however, is not limited to a particular type of composition; rather, the term composition used herein merely describes a data structure that represents a portion of source multimedia data without actually including the source data.

Compositions are transferred to and stored in playback device 7 on server 15 separately from the multimedia data stored on discs in storage unit 17. Because compositions reference, but do not actually contain, multimedia data, multiple compositions can reference the same multimedia data without actually duplicating the data. A composition is identified by an ID assigned to it by the editor at the work station 3 where the composition was created. This ID can be, for example, an eight character ASCII value.

When the composition is played by playback device 7, any multimedia data referenced in the composition is extracted from storage discs 17 and sent to the digital output 9 in the timeorder dictated by the composition.

The edit work station 3 is a computer system that can be used to create and edit the multimedia composition. An example of such a computer system is, for example, sold under the trademark "NewsCutter" and manufactured by Avid Technology, Inc. It should be understood that the present invention is not limited to a specific kind of editing workstation and that other types of editing devices may be used to form a multimedia composition.

Workstation 3 enables the user to edit source material into a composition. Multimedia data used to create a composition at the edit workstations may include original source material from sources such as video or audio tape, or compact discs; or the data may be from computer-generated images, etc. The source material for the composition is stored locally on the work station 3 and later transferred to the playback device 7 via the hub 5 for playing. Playback device 7 is shown in FIG. 2 and includes a transfer tool 11 responsible for monitoring socket 13 for connection attempts from edit workstations 3. The socket is an application programming interface that can be used, for example, for TCP/IP.

The transfer tool can be, for example, a software application on server 15, such as a C++ programming object. The workstation 3 issues a connection request when an editor wants to send a completed composition to the playback device 7. Upon receiving a connection request from an edit workstation 3, the transfer tool manages the process of data transfer from the workstation 3 to data storage 17.

The composition is transferred by the transfer tool from the workstation 3. The composition is "decomposed" by the transfer tool into a memory resident structure. The structure contains the information necessary to play the composition. Like the composition, the structure of the decomposed composition does not contain the actual media to be played, but is a playlist of segments of multimedia data. The composition can be decomposed by searching the composition for references to the segments of multimedia data which are extracted and listed serially in the order to be played. Thus, the decomposed composition will not include any of the compositions data that is necessary from an editing standpoint, such as the identification of the original tape, the identification of effects, etc.

A segment is the actual audio or video multimedia data to be played. The structure of a segment varies in size and can be larger than one megabyte. Decomposition may be carried out in the manner suggested in the Open Media Framework Specification Version 2.1.

A segment itself is defined by an ID (different from the composition ID) and the actual frame numbers of the source material to be played. To determine whether the multimedia data is stored, the server maintains a table of the clips of data from the compositions which refer to segments of multimedia data from a particular source that have been transferred to storage 17.

The clips of the composition structure also have a separate ID associated with them (also different from the composition ID). The data within the clip defines exactly what segments of a multimedia object, associated with a clip ID, are in storage 17. The clip maintains a reference count of the number of decomposed compositions that use some or all of this clip's data. The clip also maintains information about where the data resides on the storage discs 17. Thus, the clip structure includes the disc block numbers where the segments start. This is one vehicle by which a clip ID and segment can be related to a physical location on the discs.

The composition ID is also associated with the decomposed composition which is stored in the server 15. As stated above, the decomposed composition is a playlist of segments. The decomposed composition is identified by the same ID associated with its corresponding composition before it is decomposed.

After the composition is decomposed by the transfer tool, the transfer tool parses the structure (i.e., the playlist of segments) of the decomposed composition looking for required multimedia data. When a segment of audio or video multimedia data is referred to by the structure the transfer tool queries the server 15 to determine if it is contained on the storage 17. The server accomplishes this by searching through a list of clips (created from the compositions transferred to the playback device) representing the data in storage 17.

The server 15 responds to the query by indicating that the segment is either missing, present, or in transit. If all the data is present the transfer tool 11 continues to parse the structure, querying for needed media segments until it has parsed the entire decomposed composition.

The server 15 may respond to a query by indicating that some or all of a segment is missing, i.e., not in storage unit 17. The transfer tool transfers all of the missing data from the work station 3 to the playback device 7. The server may also respond to a query by indicating that data is in transit. The transfer tool queries the server later to make ensure that the data that was in transit was transferred to storage 17.

To transfer a missing multimedia data segment from the work station 3 to storage unit 17 the transfer tool 11 begins by requesting a portion of memory in storage unit 17 from the storage manager 19, for example, called ERAM in Pluto International, Inc.'s Video Space playback device. The storage manager is the interface to discs within the storage unit 17. Data is stored or retrieved from the storage unit 17 by making requests to the storage manager 19. The transfer tool moves the media from the workstation 3 into the storage manager 19 one block at a time, for example, ten frames of video at a time. The storage manager allocates memory in the storage unit 17 for the frames.

As the transfer tool receives each block of data it requests that the storage manager store the media to the discs contained in storage 17. Since it is more efficient to store full blocks of data, the transfer tool will round the number of frames required by the composition to the nearest block size (e.g., a request for frames 7–113 is rounded to 1–120). This is also advantageous if the rounded data (e.g., frames 114–120) is used later on by another composition, since this data will not have to be transferred as it is already present in storage unit 17. Although blocks of ten frames is chosen for convenience, the invention is not limited to a particular block size, and other block sizes may be used depending on the requirements of the particular multimedia system.

When the storage manager 19 has stored the multimedia data to disc it indicates a successful completion to the transfer tool and the transfer tool transfers the next multimedia block from the workstation 3. The data transfer process continues until all needed data is resident in storage 17. After all the multimedia is transferred the transfer tool informs the storage manager that the transfer is complete and returns to parsing the decomposed composition to look for the next segment of referenced data.

Eventually, the entire decomposed composition is parsed and all the multimedia data required by the composition is resident on the discs. At this point the transfer tool registers the decomposed composition in a table stored on the server 15 so that it may be called to play at a later time.

Each decomposed composition is identified by its associated ID and contains the play list which points to the associated segments of video and clips stored on the discs. The decomposed composition is a time ordered serial list of segments in storage 17. When an ID is selected, for example at a user interface (not shown) associated with the playback device the list of segments associated with that ID is played.

The decomposed composition is played back via a serial communications protocol used to control video systems such as non-linear digital disc recorders/players. An example of this protocol is the Video Disc Communication Protocol by Louth Automation.

FibreChannel and Ethernet interfaces may be used together and with appropriate network elements to transfer the composition and audio/video media from the workstation to the playback device. An Ethernet network can be used to transfer the composition and control information, and a FibreChannel connection can be used to transfer the multimedia data. FibreChannel is a high bandwidth point-to-point networking technology. The FibreChannel connection to the playback device 7 can be via an interface, such as a 5526 PCI to FibreChannel adapter card. This same card type can also reside within each work station 3. It should be noted that the invention is not limited to a particular communication interface between the work station 3 and the playback device 7 and that alternative interfaces may be used.

Figure 3:
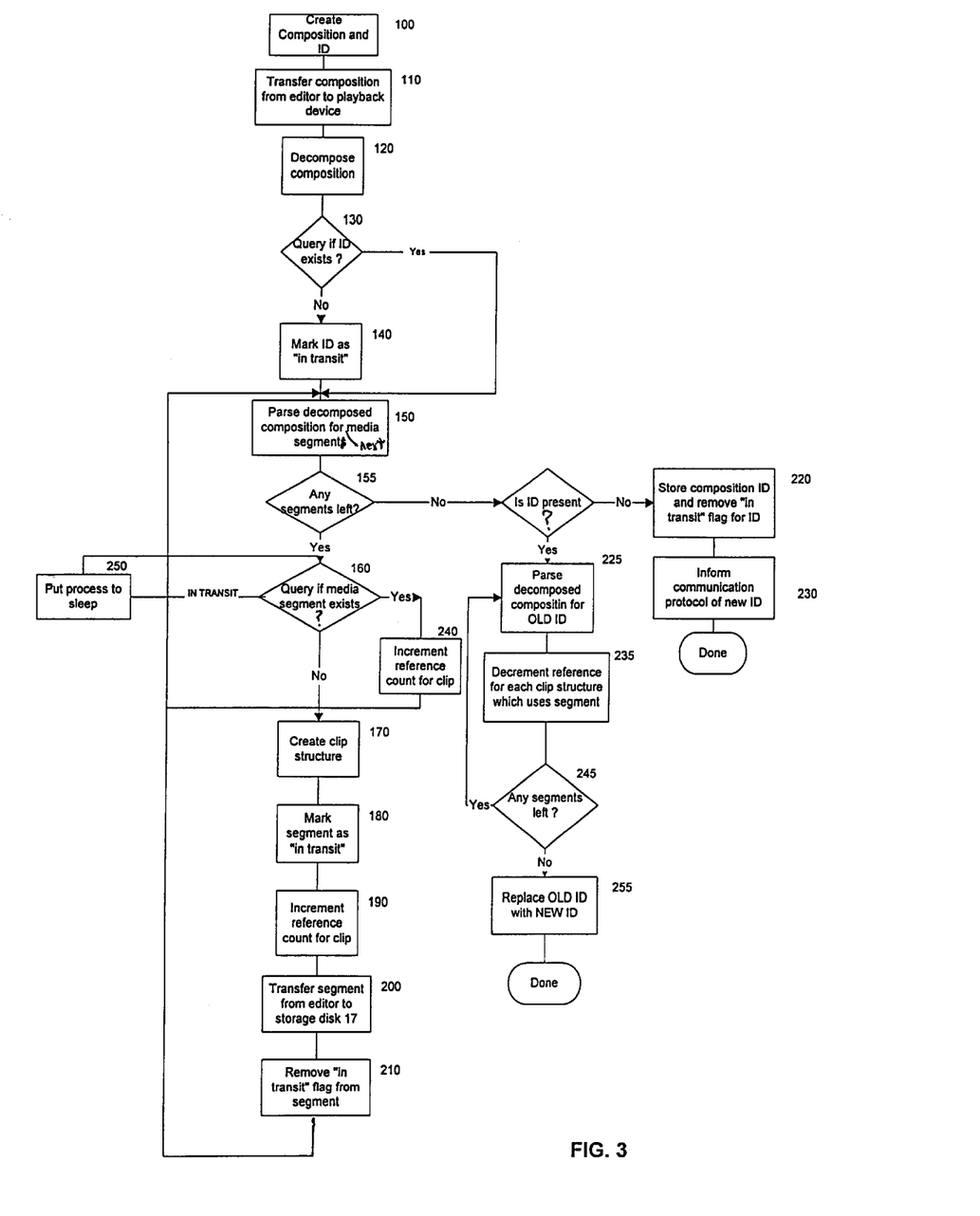
FIG. 3 shows a process of storing multimedia data in the playback device 7 of FIG. 1.

FIG. 3 shows one embodiment of the steps involved in transferring media from workstation 3 to playback device 7 in more detail. To create a composition, source material is loaded into one of the work stations 3. A media object is created for the source media. A media object is a primary data structure that includes the unique ID and which identifies a physical source of media data. The use of the media object makes it possible to create compositions separately from the digital media and to store source information that other applications can use to recreate media. Like the composition, the media object may be a C++ programming object.

In step 100, an editor creates a composition from one or more sources and gives the composition an ID, e.g., NAME1. The composition points to a specific range of video frames within one or more media objects created from the source material. The editor then initiates the transfer of the composition from the work station 3 to the playback device 7 in step 110. The transfer tool is waiting for a socket connection and is notified of the socket connection from work station 3.

In step 120 the composition is then decomposed into a structure that can be parsed by the server (i.e., a playlist of segments). The transfer tool then queries the composition ID to see if this ID already exists stored on the server 15 (Step 130). The situation where the ID exists on the server 15 is treated later. If the ID is not listed in the server, the ID in Step 140 is marked by the server as "in transit". In Step 150 the server begins to parse through the decomposed composition looking for multimedia data referred to by the composition.

For example, composition NAME1 may point to frames 1–500 of a source media object from which it was created. In Step 160 the transfer tool queries the server 15 as to whether the data segment (frames 1–500) exists in storage 17. The server accomplishes this by searching through a list of clips (created from the compositions transferred to the playback device) representing the data in storage 17. The situation where the media is present is treated hereinafter.

If the segment does not exist in storage, the transfer tool creates a clip structure in Step 170 that describes the missing multimedia data. In Step 180, since the data is not present, an in-transit flag is set for the segment being transferred. The clip structure just created points to the corresponding missing segment and has a reference count associated therewith which is incremented each time a segment of data described by the clip is used by a composition. Thus, in this case the newly created clip which references the segment is incremented by one. The reference count is used to track the frequency of use of the multimedia data stored on the storage discs 17. As explained below, this reference count is used later to determine which data should be deleted from storage when the playback device is being cleaned up.

In Step 200 the missing segment (i.e., the actual multimedia data) is transferred from the editor workstation 3 to the storage discs 17. This step includes the transfer tool calling the storage manager 19 which allocates memory for the media being transferred and returns a physical address to the transfer tool. The transfer tool then transfers the frames from the editor workstation 3 to the storage manager 19. The storage manager performs the sequence to write the data to the discs 17. The storage manager also returns the status of a successful write to the transfer tool. Thus, the transfer tool then repeats these steps transferring data in blocks from workstation 3 to a disc contained in storage 17.

After all the data is transferred, the transfer tool issues a command to the server 15 to indicate that the transfer is complete. At this point, in Step 210 the server removes the in-transit flag from the segment. The transfer tool then returns to Step 150 and parses the playlist looking for more needed multimedia data (i.e., another segment). Once it is determined in Step 155 that there is no remaining data in the composition, the process proceeds to Step 220 in which all the data required by the decomposed composition has been transferred to discs and the composition ID is stored to non-volatile memory in storage 17. The in-transit flag for the composition ID is removed and the server informs the protocol used to play the composition from the playback device 7 that the new ID is available (Step 230).

In the example described, frames 1–500 of a media object was stored to discs 17 in playback device 7. If subsequently an editor creates a composition which includes, for example, frames 200–400 of frames 1–500 of the same media object, steps 100–160 would be carried out in the same fashion and a new composition ID (e.g., NAME2) would be created for these frames (which are a subset of frames used in the previous composition). When proceeding to Step 160, however, the transfer tool queries the server 15 to determine whether the segment (frames 200–400) is present and the server returns an indication that all of the multimedia data is present.

In Step 240 the server increments the reference count for the clip structure created for frames 1–500 to indicate that another composition has referenced a segment of this clip. Thus, two compositions are going to use the same multimedia data. The process then returns to Step 150 parse through the playlist for the next segment for the decomposed composition. In this example, the composition consisted of only frames 200–400 so the flow proceeds from Step 155 to Step 220 because all the composition has been parsed. The ID NAME2 for the new composition is stored as previously described in Step 220.

Thus as seen in this example, unlike prior methods, the foregoing media transfer system does not transfer frames 200–400 for the new composition as these frames have already been stored with respect to a previous composition. In this way identical multimedia data can be shared among multiple compositions and bandwidth and storage space is saved.

The instance where the composition refers to some media data which is present and some media data which is not present is now described. For example, in the foregoing illustrative example, a third composition could be created which refers to frames 300–600 of the media object from which compositions NAME1 AND NAME2 were created. In such a case frames 300–500 would be present and the process would proceed to Step 240 for that segment. However for frames 500–600, the process would proceed from Step 160 to 170 and the missing media would be transferred in Step 200 as described hereinabove.

As described above, in Step 160 the transfer tool queries the server to determine whether the media segment exists in storage 17. There are three possible answers to this query: (1) the data is not present, (2) the data is present, and (3) the data is in transit (see Step 180). Situations (1) and (2) have been described above. Referring to situation (3), data is in transit if, for example, another composition has already requested the multimedia data requested in the new composition. If the data is in transit, the flow proceeds to Step 250.

In Step 250 the transfer tool puts the multimedia transfer process to sleep for some amount of time. After the sleep period the process wakes up and returns to step 160 to query the missing segment again. After the sleep period, hopefully all of the multimedia data has been transferred to storage 17 and is no longer flagged as "in-transit". If the data has been transferred, the process then proceeds to Step 240 and back to Step 150 in accordance with the description above.

An alteration which can be made to the above process is the case where the transfer tool has several segments to query and the first segment of the composition playlist is indicated as being in-transit. The transfer tool does not go to sleep at this point to wait for the first segment to complete transfer. Rather, it places the in-transit segment on a list and continues to parse the remaining not in transit segments. After all the work for the transfer tool has been exhausted as to the not in transit segments, the transfer tool goes to its list of in transit segments and queries each in-transit segment again. If any segments are still in transit then it is appropriate for the process to be put to sleep, i.e., do nothing for a period of time while waiting to query the segment again.

The query in Step 130 may return that the composition ID already exists stored on the server. This situation could arise, for example, when an editor decides that a particular composition should be changed or rewritten. For example, an editor could decide that he wants a video started at a different frame. In this case the process proceeds from Step 130 to Step 150 in which any missing multimedia segments are transferred from the edit workstation 3 for the new composition. When all the data is present (which it is, if, for example, initial frames of a segment are deleted) the process proceeds to Step 215 in which the composition ID is indicated as being present. In this case an ID is being stored which is already present. The server recognizes that this is an ID that is stored in its tables and assumes that this is a request to update the ID. Thus, similar to the manner described below with respect to FIG. 4, the server deletes the composition associated with the old ID.

In Step 225 the decomposed composition for the old ID is parsed and in Step 235 the clip structure which references any of the segment of reference by the old composition ID is decremented for each clip structure which uses the segment. This continues (in Step 245) until no segments are left in which in Step 255 the old ID is replaced with a new ID in the tables stored in the server. The process is then complete for updating the composition ID.

Figure 4:
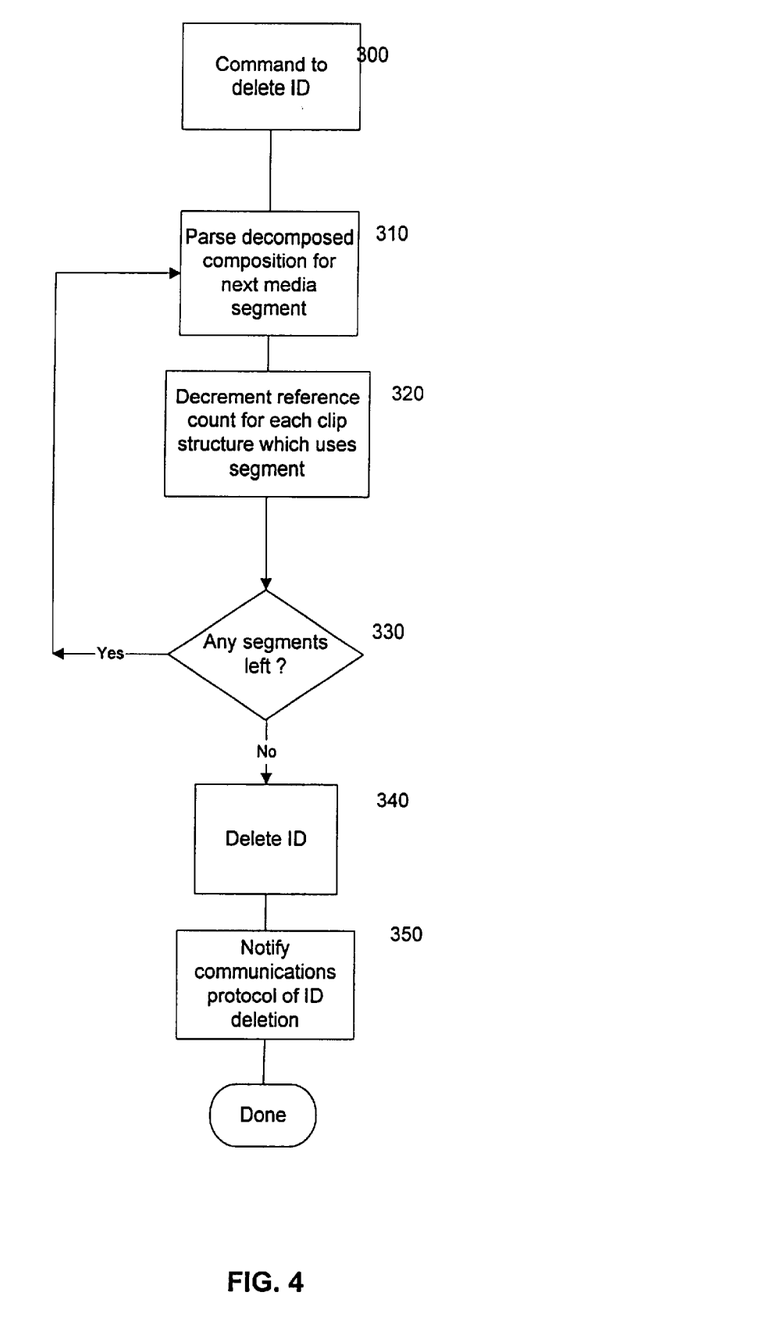
FIG. 4 shows a process of deleting composition IDs from the playback device 7.

FIG. 4 shows how a composition is deleted from the server 15 when it is decided that the composition is no longer used. In Step 300, a user chooses to delete a composition stored on the playback device 7 and enters a command to delete the appropriate ID. In Step 310 the decomposed composition stored in the server is parsed for media segments. In Step 320 the clip structure stored on the server that refers to the particular segment has its references count decremented. After all the playlist segment elements have been parsed (and the clip that references each segment has been decremented) the server proceeds to Step 340 and deletes the composition ID from the list of compositions stored in the server. The communications operating system that controls playback from the device 7 is notified of the deletion of the composition ID in Step 350.

The reference count kept for each clip is used by the server to determine when it is appropriate to delete multimedia data from the playback device. As explained above, the reference count for each clip is incremented each time a composition refers to a segment in the clip. For example, if one composition referenced three segments in a clip and another composition referenced two segments in the same clip then the reference count would be five.

The reference count indicates if data is being used or not. When requests are made to delete an ID from the server table, the server is required to parse the play list of the ID and decrement the clip reference count for each segment referenced by that clip. The server does not automatically delete a clip when the reference count becomes zero. Rather, the server only begins deleting clips when the storage 17 becomes greater than a particular percentage full, for example 50% full. Although clips have a reference count zero, this does not mean that an editor might not use the media of the clip in the future. Therefore, keeping clips with a reference count of zero stored while there is excess capacity reduces the need to transfer data from the work station 3 to playback device again if the data of the clip does become reused.

Figure 5:
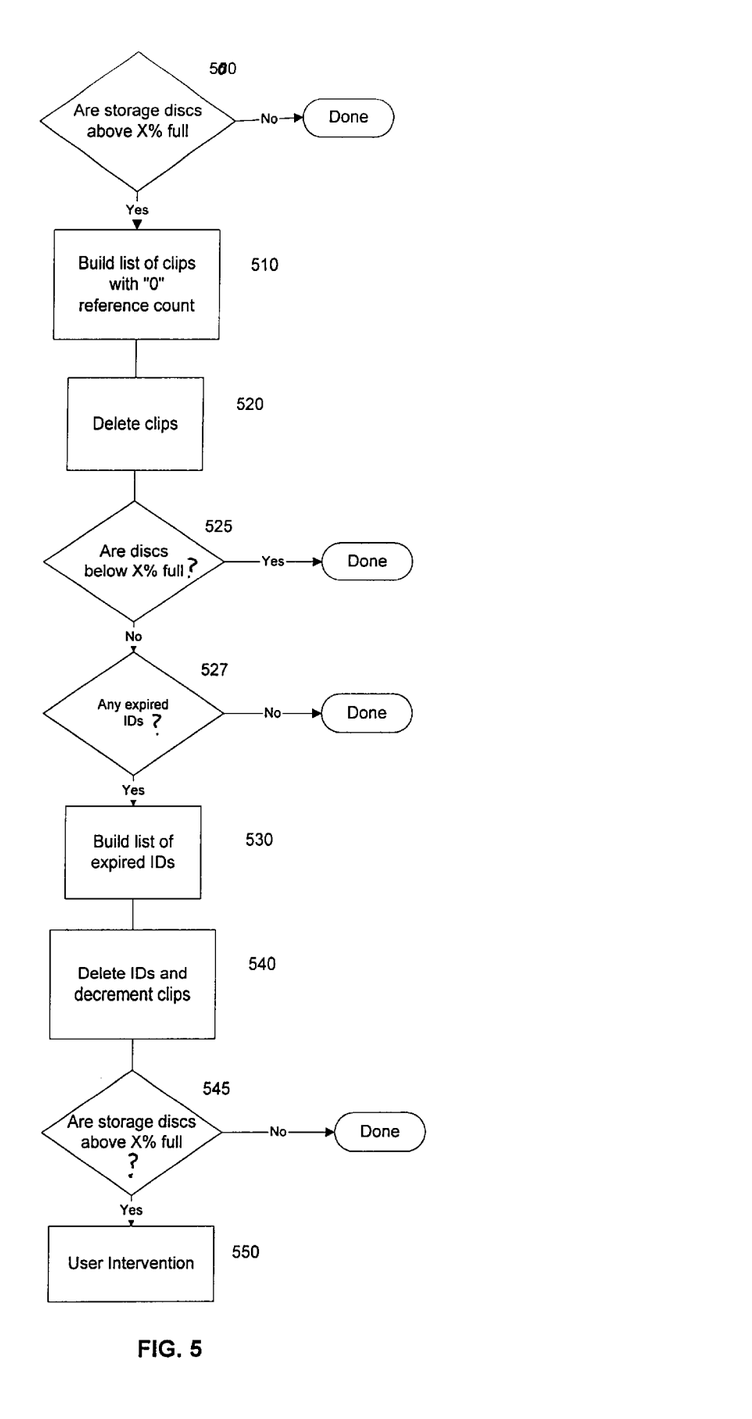
FIG. 5 shows a process performed by server 15 of FIG. 2 for deleting unused clips from the playback device 7.

The server follows the following steps for deleting media automatically, as shown in FIG. 5. In Step 500 the server periodically inquires as to whether the storage discs 17 are a particular percentage X full. The percentage can be chosen according to the requirements of the particular system. If they are not the server does not continue the process of deleting clips. If the discs are over a particular percentage full the server builds a list of clips with a reference count of zero. A reference count of zero means that no compositions currently refer to any of the data contained in the clip. The process then (in Step 520) deletes these clips.

Compositions can also have an expiration date associated therewith. (Alternatively, a consistently used composition may have delete protection associated therewith.) Thus, it may also be desired to delete composition IDs that have expired. Accordingly, in step 525 (after zero reference clips were deleted in Step 520) the server determines whether the storage discs are a particular percentage "X" full. If the discs are below X% full, the process is done. If the discs are X% full, the server determines whether any IDs have expired (Step 527). If no IDs have expired, the process is done. If there are expired IDs, a list of expired IDs is created in Step 530, and, similarly to FIG. 4, the expired IDs are deleted and the clips associated therewith have their reference count decremented in Step 540. The process again asks in Step 545 whether the storage discs are above X% full. If not, the process is done. If so, a user is notified of the lack of storage space and can take appropriate measures such as manually deleting data.

The network also accounts for the fact that playback is the top priority in the network. Thus, the storage manager 19 provides an interface which allows for a priority to be associated with a requested disc operation. There can be, for example, three priorities. The highest priority is a playback operation. The next highest is a read operation from the transfer tool from a workstation 3. Finally the lowest priority is a request for tables from the server. The last two priorities have no real time constraints whereas the first does.

This priority scheme helps the storage manager to process/prioritize operations. The use of priorities allocates storage manager bandwidth to where it is needed most. The system bandwidth must be shared between all clients (for example work stations 3). For example, if the total storage manager bandwidth is eight streams, and two play streams are active, then six streams are available for the transfer tool. However, if a record operation is initiated then there would be a total of nine active streams the transfer tool scales back the aggregate transfer rate and eventually retire one stream of the transfer tool. During this transfer transmission the storage manager supports all clients with buffers and transfers. Thus, the storage manager's priority scheme helps handle overflow conditions.

Having thus described certain embodiments of the present invention, various alterations, modifications, and improvements will readily occur to those skilled in the art. Such alterations, modifications, and improvements are intended to be within the spirit and scope of the invention. Accordingly, the foregoing description is by way of example only, and not intended to be limiting.

What is claimed is:

1. A method for transferring data from first storage associated with an editing system to second storage associated with a playback system, comprising:
   receiving a multimedia composition comprising a plurality of clips, wherein each clip references multimedia data stored in the first storage and specifies a range of video frames in the referenced multimedia data;
   transferring the multimedia composition to the playback system;
   determining whether the specified range of video frames in the multimedia data referenced by each clip of the multimedia composition is stored in the second storage associated with the playback system; and
   transferring the specified range of video frames in the multimedia data referenced by each clip of the multimedia composition from the first storage to the second storage only if the specified range of video frames in the referenced multimedia data is not already in the second storage.

2. The method of claim 1, further comprising:
   determining if any of the specified range of video frames in the multimedia data referenced by the multimedia composition is in transit to the second storage, and
   wherein the specified range of video frames is transferred only if the specified range of video frames in the multimedia data is not in transit.

3. The method of claim 2, further comprising determining whether the specified range of video frames in the multimedia data that is in transit has been transferred to the second storage.

4. A system comprising:
   at least one workstation to create a multimedia composition comprising a plurality of clips, wherein each clip references multimedia data stored in the at least one workstation and specifies a range of video frames in the referenced multimedia data;
   a playback device coupled to the at least one workstation to store and play multimedia compositions created by the at least one workstation using multimedia data stored in the playback device; and
   a transfer tool to transfer the multimedia composition and the multimedia data referenced by each clip of the multimedia composition from said at least one workstation to said playback device, wherein the transfer tool is adapted to only transfer the specified range of video frames in the multimedia data referenced by each clip of the multimedia composition if the specified range of video frames in the multimedia data referenced by the clip is not already stored in the playback device.

5. The system of claim 4, wherein the transfer tool is further adapted to only transfer the specified range of video frames in the multimedia data referenced by the multimedia composition that also is not in transit from the workstation to the playback device.

6. The method of claim 1, further comprising:
   determining how many multimedia compositions at the playback system refer to video frames in the multimedia data stored at the playback system;
   identifying video frames in the multimedia data stored at the playback system to which no multimedia compositions at the playback system refer; and
   deleting from the second storage the video frames in the multimedia data to which no multimedia compositions at the playback system refer.

7. The method of claim 6, wherein deleting is performed only if the second storage stores more than a threshold amount of multimedia data.

8. The method of claim 6, wherein determining includes maintaining a reference count that corresponds to a number of times a specified range of video frames in the multimedia data stored at the second storage is referred to by multimedia compositions at the playback system.

9. The method of claim 8, wherein determining further includes:
   incrementing the reference count for specified range of video frames in the multimedia data if a multimedia composition that references the specified range of video frames in the multimedia data is transferred to the playback system; and
   decrementing the reference count for a specified range of video frames in the multimedia data if a multimedia composition that references the specified range of video frames in the multimedia data is deleted from the playback system.

10. The system of claim 5, wherein the transfer tool further comprises means for determining whether the specified range of video frames in the multimedia data that is in transit has been transferred to the second storage.

11. The system of claim 4, further comprising:

means for determining how many multimedia compositions at the playback device refer to video frames in the multimedia data stored at the playback device;

means for identifying video frames in the multimedia data stored at the playback device to which no multimedia compositions at the playback device refer; and means for deleting from the playback device the video frames in the multimedia data to which no multimedia compositions at the playback device refer.

12. The system of claim 11, wherein the means for deleting deletes multimedia data only if the playback device stores more than a threshold amount of multimedia data.

13. The system of claim 11, wherein the means for determining includes means for maintaining a reference count that corresponds to a number of times a specified range of video frames in the multimedia data stored at the playback device is referred to by multimedia compositions at the playback device.

14. The system of claim 13, wherein the means for determining further includes:

means for incrementing the reference count for a specified range of video frames in the multimedia data if a multimedia composition that references the specified range of video frames in the multimedia data is transferred to the playback device, and means for decrementing the reference count for a portion specified range of video frames in the multimedia data if a multimedia composition that references the specified range of video frames in the multimedia data is deleted from the playback device.

15. The method of claim 1, wherein determining comprises:

sending a query to the playback system querying whether the specified range of video frames is stored in the second storage; and receiving a reply from the playback system indicating whether the specified range of video frames is stored in the second storage.

16. The method of claim 1, further comprising:

removing from the second storage video frames that are not referenced by at least one clip of a multimedia composition at the playback system.

17. The system of claim 4, wherein the transfer tool comprises:

means for sending a query to the playback device querying whether the specified range of video frames is stored in the second storage; and means for receiving a reply from the playback system indicating whether the specified range of video frames is stored in the second storage.

18. The system of claim 4, wherein the playback device removes from the second storage video frames that are not referenced by at least one clip of a multimedia composition at the playback device.

19. A computer program product, comprising:

a computer readable medium;

computer program instructions stored on the computer readable medium that, when processed by a computer, instruct the computer to perform a method for transferring data from first storage associated with an editing system to second storage associated with a playback system, comprising:

receiving a multimedia composition comprising a plurality of clips, wherein each clip references multimedia data stored in the first storage and specifies a range of video frames in the referenced multimedia data;

transferring the multimedia composition to the playback system;

determining whether the specified range of video frames in the multimedia data referenced by each clip of the multimedia composition is stored in the second storage associated with the playback system; and transferring the specified range of video frames in the multimedia data referenced by each clip of the multimedia composition from the first storage to the second storage only if the specified range of video frames in the referenced multimedia data is not already in the second storage.

20. The computer program product of claim 19, wherein the method further comprises:

determining if any of the specified range of video frames in the multimedia data referenced by the multimedia composition is in transit to the second storage, and wherein the specified range of video frames is transferred only if the specified range of video frames in the multimedia data is not in transit.

21. The computer program product of claim 19, wherein the method further comprises determining whether the specified range of video frames in the multimedia data that is in transit has been transferred to the second storage.

22. The computer program product of claim 19, wherein the method further comprises:

determining how many multimedia compositions at the playback system refer to video frames in the multimedia data stored at the playback system;

identifying video frames in the multimedia data stored at the playback system to which no multimedia compositions at the playback system refer; and deleting from the second storage the video frames in the multimedia data to which no multimedia compositions at the playback system refer.

23. The computer program product of claim 22, wherein deleting is performed only if the second storage stores more than a threshold amount of multimedia data.

24. The computer program product of claim 22, wherein determining includes maintaining a reference count that corresponds to a number of times a specified range of video frames in the multimedia data stored at the second storage is referred to by multimedia compositions at the playback system.

25. The computer program product of claim 24, wherein determining further includes:

incrementing the reference count for a specified range of video frames in the multimedia data if a multimedia composition that references the specified range of video frames in the multimedia data is transferred to the playback system; and decrementing the reference count for a specified range of video frames in the multimedia data if a multimedia composition that references the specified range of video frames in the multimedia data is deleted from the playback system.

* * * * *